United States Patent [19]

Kondo

[11] Patent Number: 4,703,352
[45] Date of Patent: Oct. 27, 1987

[54] HIGH EFFICIENCY TECHNIQUE FOR CODING A DIGITAL VIDEO SIGNAL

[75] Inventor: Tetsujiro Kondo, Kanagawa, Japan

[73] Assignee: Sony Corporation, Tokyo, Japan

[21] Appl. No.: 809,775

[22] Filed: Dec. 17, 1985

[30] Foreign Application Priority Data

Dec. 19, 1984 [JP] Japan .................................. 59-266407
Dec. 19, 1984 [JP] Japan .................................. 59-266408
Dec. 21, 1984 [JP] Japan .................................. 59-269868

[51] Int. Cl.$^4$ ........................ H04N 7/12; H04N 1/40
[52] U.S. Cl. .................................. 358/135; 358/138; 358/260
[58] Field of Search ............... 358/135, 136, 138, 260, 358/280

[56] References Cited

U.S. PATENT DOCUMENTS 4,455,571 6/1984 Shimuzu et al. ..................... 358/138
4,547,811 10/1985 Ochi et al. ....................... 358/282 X Primary Examiner—E. A. Goldberg
Assistant Examiner—Patrick W. Foster
Attorney, Agent, or Firm—Lewis H. Eslinger; Alvin Sinderbrand

[57] ABSTRACT

In an apparatus for coding digital video data in the form of blocks thereof dynamic range information is generated from maximum and minimum values of the digital video data representing plural picture elements in each block, the minimum value is substracted from each of the digital data to generate modified digital video data, the modified digital video data is encoded with a fixed digitized bit number less than that of the original digital video data, and the encoded data and an additional code for each block are transmitted, with such additional code being formed of at least two of the maximum and minimum values for the respective block and a signal corresponding to the dynamic range information for each block.

8 Claims, 19 Drawing Figures

16 PICTURE ELEMENTS

HIGH EFFICIENCY TECHNIQUE FOR CODING A DIGITAL VIDEO SIGNAL

BACKGROUND OF THE INVENTION

1. Field of the Invention

The present invention relates to a highly efficient technique for coding digital video signals and, in particular, to a highly efficient coding apparatus for compressing the data of digital video signals by dividing the data in each picture field into many blocks and processing each block separately.

2. Description of the Prior Art

There are several known methods which effectively compress the data of the video signal by either directly reducing the number of bits per picture element, or reducing sampling frequency with each picture frame.

One known technique reduces the amount of data to $\frac{1}{2}$ its original level by subsampling the image data in each field; that is, alternating picture elements are transmitted for the entire picuture field. At the receiver, the value of each non-transmitted picture element is approximately computed by performing an interpolation using the transmitted picture elements. Thus, the effective sampling frequency is reduced by 50%.

Another technique, called DPCM (Differential Pulse Code Modulation), reduces the average number of bits per picture element. This technique takes advantage of the high level of correlation between adjacent picture elements. Basically, since the correlation between picture elements is high, the difference between adjacent picture elements is small. Thus, this difference between adjacent picture elements is transmitted, rather than the actual value of each picture element.

A third technique which reduces the average number of bits per picture element also capitalizes on the high level of correlation between adjacent picture elements. The picture is divided into many blocks. In each block, a representative picture element is selected. Then, for each element in the block, a value corresponding to the deviation of this element's value from the representative value is transmitted.

The technique which uses sub-sampling (every other picture element is transmitted) is highly susceptible to aliasing because the sampling frequency has been effectively reduced by 50%.

In the DPCM method, coding errors tend to have serious consequences for subsequent coding.

The method which divides each picture field into many blocks has a serious drawback in that block distortion occurs at the boundary between blocks.

SUMMARY OF THE INVENTION

It is an object of the present invention to provide a highly efficient coding apparatus which avoids the problems of the foregoing conventional technology, such as the occurrence of aliasing distortion, the propagation of coding error, and the occurrence of block distortion.

According to an aspect of this invention, each picture field is divided into a plurality of blocks. Each block is then processed separately. First, the block's dynamic range (difference between the maximum and minimum picture element levels within the block) and the minimum level are obtained. The block's dynamic range is now divided into equally spaced levels, and each picture element within the block is assigned to the nearest level. These levels are now assigned a digital value. For example, if there were 8 levels, then each level would be represented by a 3-bit number. For transmission, the level assigned to a given picture element is transmitted, rather than the original picture element value. Also, for each block, the block's dynamic range and minimum level are transmitted. With this information, each picture element can be reconstructed at the receiver.

Since picture elements of a given picture field are highly correlated both spatially (in the horizontal and vertical directions) and temporally (along the time base), the dynamic range of the picture element data included in a block of one, two, or three dimensions is small in non-moving portions of the picture field. Since the dynamic range is small, then even if the number of new levels used to divide the dynamic range is smaller than the original number of levels in the dynamic range, the digitization distortion will be very small.

The above and other objects, features and advantages of the present invention will become apparent from the following detailed description which is to be read with reference to the accompanying drawings.

DETAILED DESCRIPTION OF THE PREFERRED EMBODIMENTS

Figure 1:
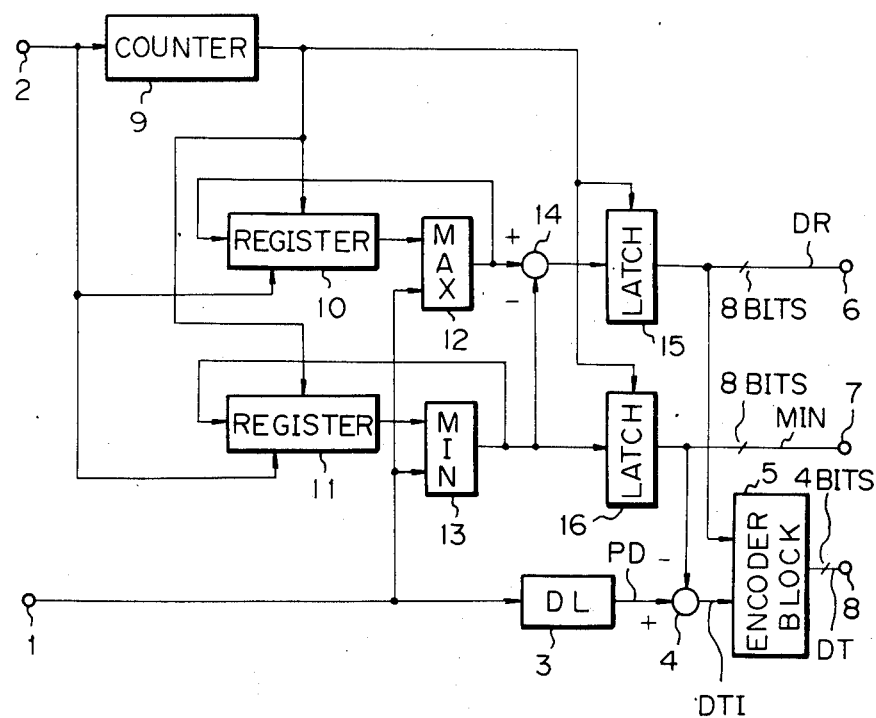
FIG. 1 is a block diagram of an embodiment of the present invention.

An embodiment of the present invention will now be described hereinbelow with reference to the drawings. In FIG. 1, a digital video signal of eight bits is inputted in parallel to an input terminal 1. This input digital video signal is supplied to a subtracter 4 through a delay circuit 3.

A sampling clock synchronized with the input digital video signal is supplied to an input terminal 2. This sampling clock is supplied as a clock to a counter 9 and registers 10 and 11. The counter 9 is a hexadecimal counter and a block clock signal is generated as an output of this counter for every sixteen picture elements. This block clock is supplied as a pulse for the initialization of registers 10 and 11. The block clock is also supplied as a latch pulse to latches 15 and 16.

Registers 10 and 11 can input and output 8-bit parallel data. An output data from register 10 is supplied to one input terminal of a selecting circuit 12. An output data of register 11 is supplied to one input terminal of a selecting circuit 13. The input digital video signal is supplied to the other input terminals of the selecting circuits 12 and 13.

The selecting circuit 12 is configured as a digital level comparator for selecting and outputting the largerlevel of the two input data. The selecting circuit 13 is configured as a digital level comparator for selecting and outputting the smaller-level of the two input data. The digital output data of the selecting circuit 12 is supplied to one input terminal of a subtracter 14 and to the input terminal of the register 10. A digital output data of the selecting circuit 13 is supplied to the other input terminal of the subtracter 14 and to the input terminal of the register 11.

Figure 2:
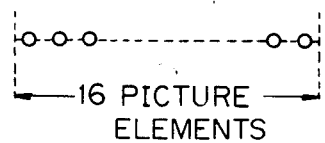
FIG. 2 is a schematic diagram for explaining a block as a unit which is subjected to a coding process.

As shown in FIG. 2, this embodiment, one block consists of data representing 16 continuous picture elements of the same line. The block clock from the counter 9 is generated at the first position of each block to initialize registers 10 and 11. All the bits of register 10 are initialized to "0". All of the bits of register 11 are initialized to "1".

The picture element data at the first position of one block is selected by the selecting circuits 12 and 13 and stored into the registers 10 and 11. The next picture element data is compared with the picture element data stored in the registers 10 and 11 and the data of the larger level is selected and outputted from the selecting circuit 12. The data of the smaller level is selected and outputted from the selecting circuit 13. In a similar manner, all of the picture element data in one block are sequentially compared. Upon completion of this comparison, the Maximum level (MAX) of these 16 picture elements is selected and outputted at the output terminal of the selecting circuit 12. The Minimum level (MIN) of these 16 picture elements is selected and outputted at the ouput terminal of the selecting circuit 13.

The subtracter 14 subtracts the minimum level MIN from the maximum level MAX, so that the dynamic range DR of the block is supplied at an output terminal of the subtracter 14. The dynamic range DR which is outputted from the subtracter 14 is latched in the latch 15. The minimum level MIN which is outputted from the selecting circuit 13 is latched in the latch 16. The dynamic range DR stored in the latch 15 is taken out at an output terminal 6 and also supplied to an encoder block 5. The minimum level MIN stored in the latch 16 is taken out at output terminal 7 and also supplied to the other input terminal of the subtracter 4.

The picture element data PD from the delay circuit 3 is supplied to the subtracter 4. Thus, the data DTI from which the minimum level MIN was removed is generated at the output terminal of the subtracter 4. The data DTI is supplied to the encoder block 5. As will be explained hereinafter, encoder block 5 divides the dynamic range DR into sixteen equal levels. The data DTI is now assigned to one of these 16 levels (whichever is closest to the original value). This newly assigned value determines to which original DTI data value the picture element belongs. The four-bit DT code corresponding to the appropriate level specified in this manner is taken out at ouptut terminal 8 of the encoder block 5.

As described above, the dynamic range DR and the minimum level MIN are obtained as additional data at the output terminals 6 and 7 of the encoder shown in FIG. 1. The compressed code of four bits is obtained at the output terminal 8.

One block of the original digital video signal consists of 128 bits ($16 \times 8$ bits). In this embodiment, one block in the DT code is constituted by 80 bits ($= 16 \times 4$ bits $+ 16$ bits): thus, the number of bits to be transmitted has been reduced. Although not shown, the code DT and the additional data DR and MIN are subjected to an error correction coding process and transmitted (or recorded in a recording medium) as serial data.

Figure 3A:
FIGS. 3A–3C are schematic diagrams for explaining a plurality of examples of arrangements of transmission data.
Figure 3B:
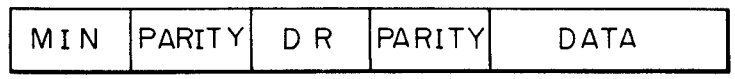
Figure 3C:

FIGS. 3A–3C show three examples of formats for the transmission data. FIG. 3A shows the case where 64 bits consisting of the minimum level MIN, dynamic range DR, and DT code are subjected to the coding processes of independent error correction, and the parities of the respective error correction codes are added to those data and the resultant data is transmitted. FIG. 3B shows the case where the minimum level MIN and dynamic range DR are subjected to the coding processes of independent error correction, and the parities of the respective error correction codes are added to them. FIG. 3C shows the case where both of the minimum level MIN and dynamic range DR are subjected to the coding processes of common error correction, and the parity of this error correcton code is added to them.

It is preferable that the number of digitized bits of the DT code is as small as possible to suppress redundancy. To prevent an increase in quantization distortion, however, it is undesirable to overly reduce the number of digitized bits. For video signals, the respective picture elements in one block have high correlation, so that the dynamic range DR in the nonmoving portion of the picture is not so large, and it is sufficient to set the number of digitized bits to about 128 as the maximum value.

Figure 4:
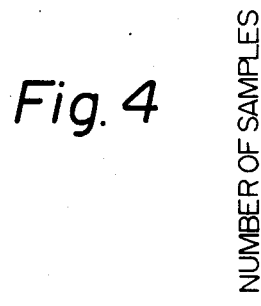
FIG. 4 is a schematic diagram for explaining the level distribution of the picture element data in one block.

As shown in FIG. 4, in the case where the number of digitized bits is eight, a total of 256 (0 to 255) kinds of levels of the video signal can be presented. However, in the non-motion portion of the picture, excluding the transient portion such as the contour of an object, the distribution of the levels of the picture elements of one block is concentrated in a fairly narrow range as shown in FIG. 4. Therefore, an increase of the digitization distortion can be prevented by setting the number of bits of the DT code to four, as in this emodiment.

For example, the number of digitized bits of the dynamic range DR becomes 128 in the worst case. Even in this case, when the number of digitized bits is four, the number of picture element levels within each DT level is 8, so that maximum digitization distortion becomes four. Such a degree of digitization distortion cannot be visually distinguished.

Figure 5:
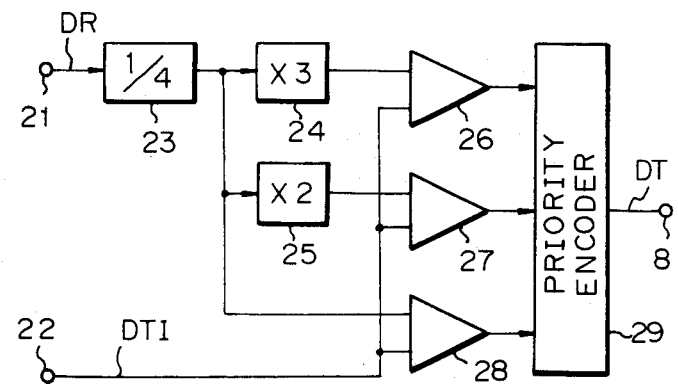
FIG. 5 is a block diagram showing an example of an encoder block.

FIG. 5 shows one possible configuration of the encoder block 5. To simplify the explanation, the number of digitized bits is set to two instead of four, so the dynamic range is divided into four equal parts rather than sixteen.

In FIG. 5, the dynamic range DR is supplied to input terminal 21 and the data DTI from which the minimum level was removed is supplied to input terminal 22. The dynamic range DR is divided by 4 by divider 23 (consisting of a bit shifter to shift the input data by two bits).

An output of divider 23 is supplied to multipliers 24 and 25. Multiplier 24 triples the output of divider 23 and supplies this value to one input terminal of level comparator 26. Multiplier 25 doubles the output of divider 23 and supplies this value to one input terminal of level comparator 27. The output of the divider 23 is supplied to one input terminal of level comparator 28. The data DTI from which the minimum level was removed is supplied to the other input terminals of level comparators 26, 27, and 28, respectively.

Assuming that respective outputs of the level comparators 26 to 28 are $C_1$, $C_2$, and $C_3$, these outputs change as shown below in accordance with the level of the data DTI.

(1) When $(\frac{3}{4}) \cdot DR \leq DTI \leq DR$,
   $C_1 = $ "1", $C_2 = $ "1", $C_3 = $ "1".
(2) When $(2/4) \cdot DR \leq DTI < (\frac{3}{4}) \cdot DR$,
   $C_1 = $ "0", $C_2 = $ "1", $C_3 = $ "1".
(3) When $(\frac{1}{4}) \cdot DR \leq DTI < (2/4) \cdot DR$
   $C_1 = $ "0", $C_2 = $ "0", and $C_3 = $ "1".
(4) When $0 \leq DTI < (\frac{1}{4}) \cdot DR$,
   $C_1 = $ "0", $C_2 = $ "0", $C_3 = $ "0".

The outputs $C_1$, $C_2$, and $C_3$ of level comparators 26 to 28 are supplied to priority encoder 29. The two-bit code DT is obtained at the output terminal 8 of priority encoder 29. The encoder 29 generates a code of (1 1) in case (1), a code of (1 0) in case (2), a code of (0 1) in case (3), and a code of (0 0) in case (4).

Figure 6:
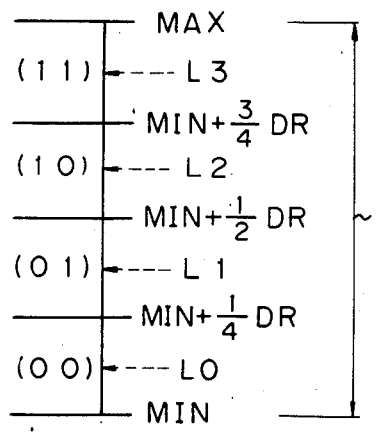
FIG. 6 is a schematic diagram for explaining the encoder block.

As shown in FIG. 6, the picture element data PD of one block falls within the dynamic range DR from the minimum level MIN to the maximum level MAX. The divider 23 and multipliers 24 and 25 divide the dynamic range DR into four equal parts. Comparators 26 to 28 determine to which of the 4 levels each data DTI belongs, and the result is converted to a two-bit code corresponding to the level range chosen.

Figure 7:
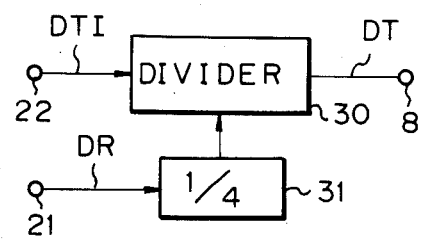
FIG. 7 is a block diagram showing another example of an encoder block.

FIG. 7 shows an example of another arrangement of the encoder block 5. The dynamic range DR from input terminal 21 is divided by 4 by divider 31. An output signal of divider 31 is supplied as the denominator input to digital divider 30. The data DTI (after the removal of the minimum level) is supplied at input terminal 22 as the numerator input to divider 30. The two-bit code DT is taken at the output of divider 30. The divider 30 generates a two-bit output corresponding to the value of the DT code.

Also, although not shown, the encoder block 5 may be realized by a ROM to which a total of sixteen bits (the digital data DTI after the removal of the minimum level and the dynamic range DR) are supplied as an address.

In this embodiment, as is evident from FIG. 6, the dynamic range are divided into equal parts, and the central values $L_0$, $L_1$, $L_2$, and $L_3$ of each part is used as values upon decoding. This coding/decoding method helps reduce digitization distortion.

Figure 8:
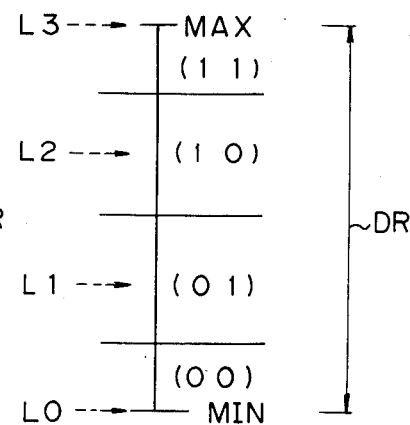
FIG. 8 is a schematic diagram for explaining another coding method of an encoder block.

However, the picture element data having the minimum level MIN and the maximum level MAX exist in each block. Therefore, as shown in FIG. 8, to increase the number of codes having no error, the dynamic range DR is divided into $(2^m - 1)$ equal parts (where m is the number of digitized bits). In this way, the minimum level MIN may be set to the representative level $L_0$ and the maximum level MAX may be set to the representative level $L_3$.

Figure 9:
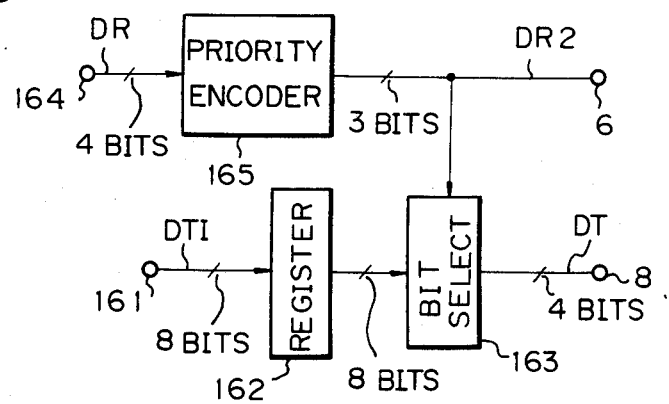
FIG. 9 is a block diagram showing still another example of an encoder block.

FIG. 9 shows an arrangement of still another example of encoder block 5. In FIG. 9, the data DTI (after the removal of the minimum level) is supplied to an input terminal 161 and stored into register 162. An output of register 162 is supplied to an input terminal of a bit selecting circuit 163.

The dynamic range DR from latch circuit 15 in FIG. 1 is supplied to an input terminal 164. The dynamic range DR is supplied to a priority encoder 165. The bit selecting circuit 163 is controlled by an output of three bits of encoder 65. Among the eight bits of the data DTI, four bits corresponding to the output of the encoder 165 are selected by the bit selecting circuit 163.

The output data of the priority encoder 165 is taken out as a dynamic range data $DR_2$ which is transmitted to the output terminal 6. The four-bit output data of the bit selecting circuit 163 is taken at the output terminal 8 and transmitted as the code DT.

The priority encoder 165 generates the three-bit output ($C_2$, $C_1$, $C_0$) in correspondence to the bit pattern of the high order four bits of the dynamic range DR. In response to the output of the encoder 165, the bit selecting circuit 163 selects four bits ($Y_3$, $Y_2$, $Y_1$, $Y_0$) from among eight bits ($X_7$, $X_6$, ..., $X_0$) of the data DTI (after the removal of the minimum level) and outputs this four-bit data as the code DT.

The relation between the output of the priority encoder 165 corresponding to the high order four bits of the dynamic range DR and the output of four bits of the bit selecting circuit 163 which are selected by an output of the priority encoder 165 is shown in the table below.

| DR MSB | C2 | C1 | C0 | Outputs of the bit selecting circuit | | | |
|---|---|---|---|---|---|---|---|
| | | | | Y3 | Y2 | Y1 | Y0 |
| 1/// | 0 | 0 | 0 | X7 | X6 | X5 | X4 |
| 01// | 0 | 0 | 1 | X6 | X5 | X4 | X3 |
| 001/ | 0 | 1 | 0 | X5 | X4 | X3 | X2 |
| 0001 | 0 | 1 | 1 | X4 | X3 | X2 | X1 |
| 0000 | 1 | 0 | 0 | X3 | X2 | X1 | X0 |

The magnitude of the dynamic range DR is detected from the high order four bits and the minimum digitization unit is elected on the basis of the magnitude of the dynamic range Dr. Three bits ($C_2$, $C_1$, $C_0$) indicative of the digitization unit are transmitted as the dynamic range information $DR_2$.

Figure 10:
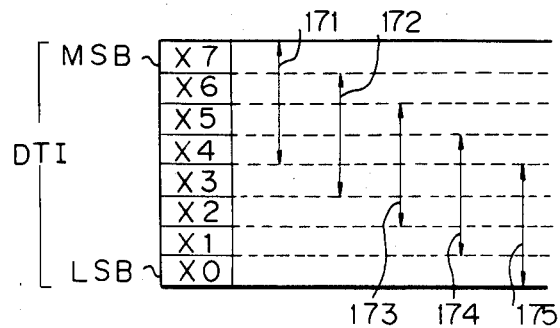
FIG. 10 is a schematic diagram for explaining a coding method of the encoder block of FIG. 9.

In FIG. 10, a reference numeral 171 denotes four bits which are selected when the most significant bit MSB of the dynamic range DR is "1". In this case, the minimum digitization unit is 16. Numeral 172 denotes four bits which are selected when the MSB of the dynamic range DR is "0" and the second high order bit is "1". In this case, the minimum digitization unit is 8. Numeral 173 indicates four bits which are selected when the MSB and the second high order bit of the dynamic range DR are "0" and the third high order bit is "1". In this case, the minimum digitization unit is 4. Numeral 174 represents four bits which are selected when the MSB and the second and third high order bits of the dynamic range DR are "0" and the fourth high order bit is "1". In this case, the minimum digitization unit is 2. Numeral 175 indicates four bits which are selected when all of the high order four bits of the dynamic range are "0". In this case, the minimum digitization unit is 1.

Figure 11:
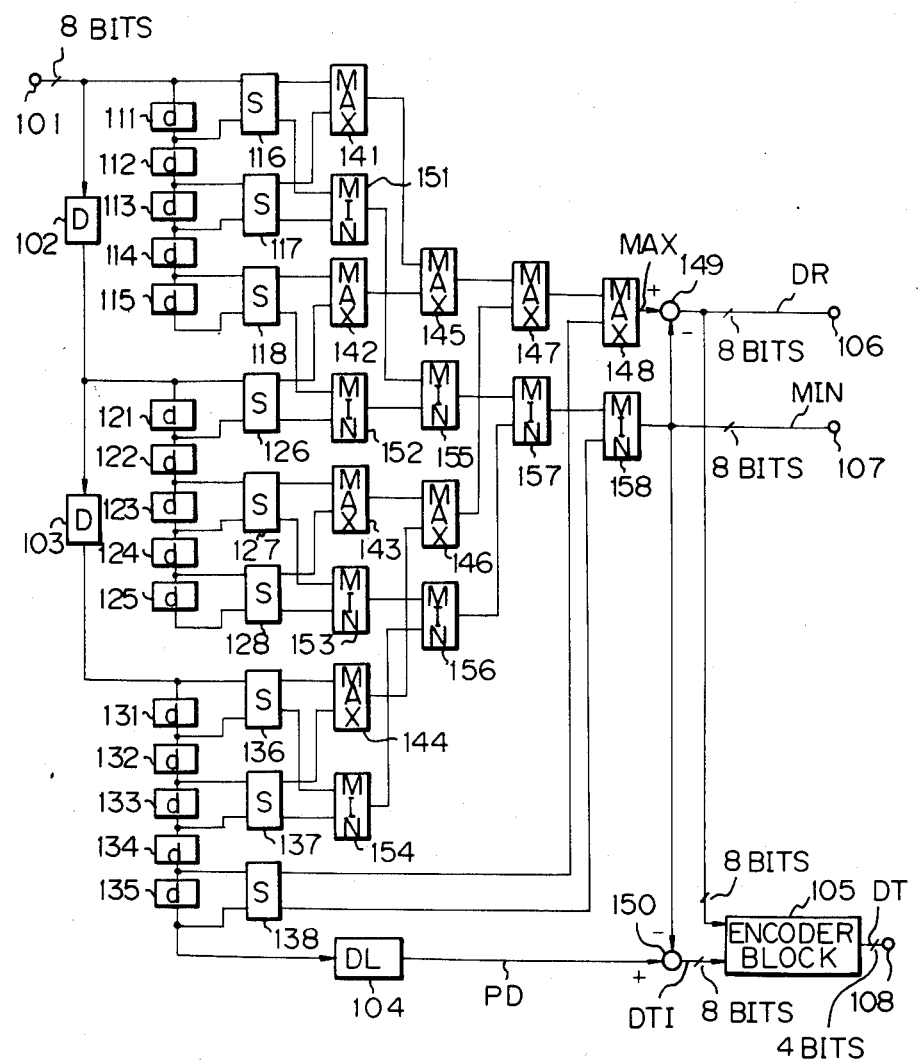
FIG. 11 is a block diagram showing another embodiment of the invention.

Another embodiment of the invention, namely, an example whereby the invention is applied to picture elements of a two-dimensional block will now be explained with reference to the drawings. FIG. 11 shows the entire arrangement of an encoder for this embodiment. A digital video signal of the NTSC system in which, for example, one sample is digitized to eight bits, is inputted to an input terminal 101. This digital video signal is supplied to a cascade connection of line delay circuits 102 and 103, and to a cascade connection of five sample delay circuits 111 to 115.

A cascade connection of five sample delay circuits 121 to 125 is connnected to the connecting point of the line delay circuits 102 and 103. A cascade connection of five sample delay circuits 131 to 135 is connected to the output terminal of line delay circuit 103. Due to the line delay circuits 102 and 103 (each having a delay amount of one line period) and the sample delay circuits 111 to 115, 121 to 125, and 131 to 135 (each having a delay amount equal to the sampling period of the input digital video signal), the picture element data of one block can be simultaneously obtained from output terminals of the respective delay circuits.

Figure 12:
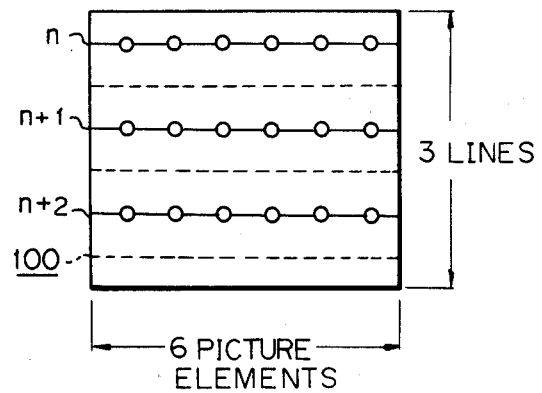
FIG. 12 is a schematic diagram for explaining a block as a unit which is subjected to a coding process in FIG. 11.

In FIG. 12, a reference numeral 100 indicates one block, solid lines denote continuous n-th, (n+1)-th, and (n+2)-the lines of the current field, and broken lines represent lines of the next fields. One block consists of three lines. Each line contains six picture elements. When the picture element data of the (n+2)-th line is supplied to the input terminal 101, the picture element data of the (n+1)-th line is generated at an output of the line delay circuit 102, and the picture element data of the n-th line is generated at an output of the line delay circuit 103. Six picture element data from each line are accessed at the input and output terminals of each cascade connection of the sample delay circuits, as well a between each of the delay circuits.

Two of the six picture element data of the same line (taken out by the cascade connection of the sample delay circuits 111 to 115) are supplied to each of the three selecting circuits 116, 117, and 118, respectively. Similarlly, selecting circuits 126, 127, and 128 are each supplied with two picture element data from sample delay circuits 121 to 125. As well, selecting circuits 136, 137, and 138 are each supplied with two picture element data from sample delay circuits 131 to 135. Each of these selecting circuits is a digital level comparator which is configured to compare the levels of two picture element data inputted, and output the picture element data of larger magnitude at one output terminal and output the picture element data of smaller magntiude at the other output terminal.

One output terminal of each of the selecting circuits 116 and 117 is connected to an input terminal of a selecting circuit 141. The other output terminals of the selecting circuits 116 and 117 are connected to an input terminal of a selecting circuit 151. One output terminal of each of the selecting circuits 118 and 126 is connected to an input terminal of a selecting circuit 142 and the other output terminals of the selecting circuits 118 and 126 are connected to an input terminal of a selecting circuit 152. One output terminal of each of the selecting circuits 127 and 128 is connected to an input terminal of a selecting circuit 143 and the other output terminals of the selecting circuits 127 and 128 are connected to an input terminal of a selecting circuit 153. One output terminal of each of the selecting circuits 136 and 137 is connected to an input terminal of a selecting circuit 144 and the other output terminals of the selecting circuits 136 and 137 are connected to an input terminal of a selecting circuit 154.

Each of the selecting circuits 141 to 144 is a digital level comparator which is configured to compare the levels of two picture element data inputted and selectively output only the picture element data of large magnitude. Each of the selecting circuits 151 to 154 is a digtial level comparator which is configured to compare the levels of two picture element data inputted and selectively output only the picture element data of smaller magnitude.

The outputs of the selecting circuits 141 and 142 are supplied to a selecting circuit 145. The outputs of the selecting circuits 143 and 144 are supplied to a selecting circuit 146. The outputs of the selecting circuits 145 and 146 are supplied to a selcting circuit 147. The output of the selecting circuit 147 and the output of the larger level of the selecting circuit 138 are supplied to a selecting circuit 148. The selecting circuits 145 to 148 selectively output the picture element data of larger magnitude similar to the selecting circuits 141 to 144. Therefore, the picture element data of the maximum level MAX among eighteen picture element data in the block 100 is generated at an output terminal of the selecting circuit 148.

The outputs of the selecting circuits 151 and 152 are supplied to a selecting circuit 155. The outputs of the selecting circuits 153 and 154 are supplied to a selecting circuit 156. The outputs of the selecting circuits 155 and 156 are supplied to a selecting circuit 157. The output of the selecting circuit 157 and the output of the smaller level of the selecting circuit 138 are supplied to a selecting circuit 158. The selecting circuits 155 to 158 selectively output the picture element data of smaller magnitude, similar to the selecting circuits 151 to 154. Therefore, the picture element data of the minimum level MIN among eighteen picture element data in the block 100 is generated at an output terminal of the selecting circuit 158.

The outputs of the selecting circuits 148 and 158 are supplied to subtracter 149. The subtracter 149 subtracts the minimum level MIN from the maximum level MAX, so that the dynamic range DR of eight bits is obtained at an output terminal 106. The minimum level MIN is taken out at an output terminal 107 and supplied to a subtracter 150.

The picture element data PD generated at the output of the sample delay circuit 135 is supplied to the subtracter 150 through a delay circuit 104. The delay circuit 104 has a delay amount equal to the time lag which is caused by the detection of the maximum level MAX and minimum level MIN as mentioned above. The picture element data DTI of eight bits from which the minimum level was removed is obtained at the output of the subtracter 150.

The dynamic range DR and the picture element data DTI (after the removal of the minimum level) are supplied to an encoder block 105. The encoder block 150 divides the dynamic range DR into equal parts according to the number of digitized bits (four bits in this example), and determines in which one of the divided areas the picture element data DTI (after the removal of the minimum level) is included, and generates the four-bit code DT to specify the decided area at an output terminal 108. The arrangement shown in FIG. 5, 7, or 9 may be used as a practical arrangement of encoder block 5.

As described above, the dynamic range DR and minimum level MI are obtained as additional data at the output terminals 106 and 107 of the encoder shown in FIG. 11. The compressed code of four bits is derived at the output terminal 108.

One block of the original digital video signal consists of 144 bits (=3×6×8 bits). According to this embodiment, one block of the transmitted signal consists of 88 bits (=3×6×4 bits+16 bits), so that the number of bits to be transmitted can be reduced by about one half.

The code DT which is obtained at the output terminal 108 of the encoder has the same sequence as the input video signal. Therefore, the additional data MIN and DR of each block are generated for every three lines with respect to the line, and for every six samples with regard to the sampling direction. When the transmission data is divided for every predetermined amount of the code DT, an interval including no additional data occurs in the transmission process. Therefore, a buffer memory is connected to the output of the encoder and the additional data DR and MIN and the code DT of one block may be used as a unit of transmission. In this case, the length of the data portion consisting of the coded code DT in FIG. 3 becomes 64 bits (=4 bits×16).

Figure 13:
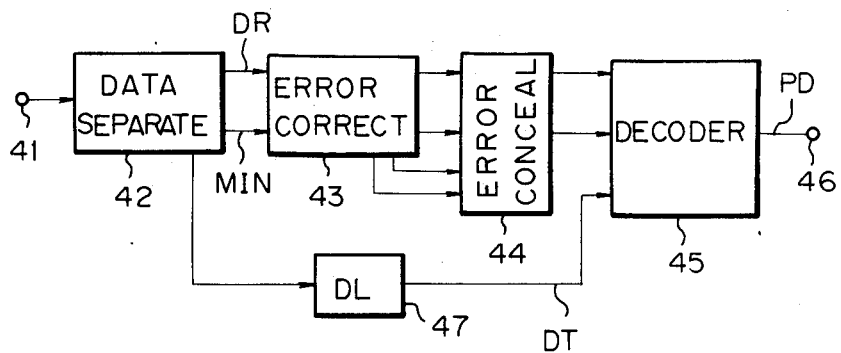
FIG. 13 is a block diagram showing an arrangement of the reception side.

FIG. 13 shows an arrangement of the reception (or reproduction) side. Reception data from an input terminal 41 is supplied to a data separating circuit 42, by which the DT code and additional codes are separated. The additional codes, namely, the minimum level MIN and dynamic range DR, are supplied to an error correcting circuit 43 to correct any transmission error. An error concealing circuit 44 is connected to the error correcting circuit 43. The error concealing circuit 44 conceals (interpolates) the additional codes which could not be corrected on the basis of an error flag from the error correcting circuit 43.

The additional codes which are outputted from the error concealing circuit 44 and the coded code DT, the timing of which was matched by a delay circuit 47, are supplied to a decoder 45. The code DT is decoded by the decoder 45 and the original picture element data PD is taken out at an output terminal 46 of the decoder 45. The decoder 45 decodes the eight-bit picture element data PD from the aditional codes DR and MIN, each consisting of eight bits, and from the 4-bit DT code.

Figure 14:
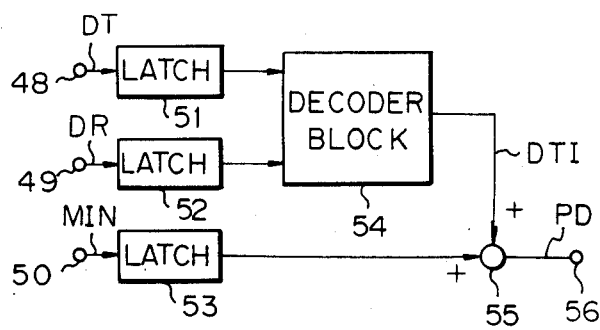
FIG. 14 is a block diagram of a decoder.

The decoder 45 is configured as shown in FIG. 14. In FIG. 14, the code DT, dynamic range DR, and minimum level MIN from input terminals 48, 49, and 50 are stored into latches 51, 52, and 53, respectively.

The code DT from the latch 51 and the dynamic range DR from the latch 52 are supplied to a decoder block 54. The data DTI (after the removal of the minimum level) is decoded by the decoder block 54. The data DTI and the minimum level MIN from the latch 53 are added by an adder 55, so that the picture element data PD is taken out at an output terminal 56 of the adder 55. The decoder block 54 decodes the representative value corresponding to the code DT.

Figure 15:
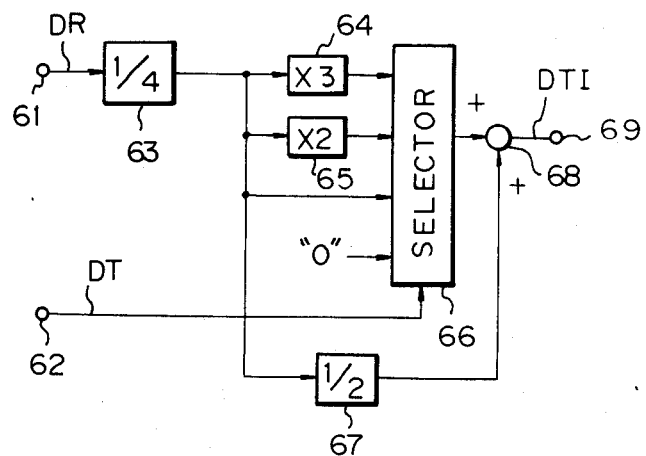
FIG. 15 is a block diagram of an example of a decoder block.

FIG. 15 shows an arrangement of one example of the decoder block 54. In the decoder block show in in FIG. 15 and a decoder block shown in FIG. 16 which will be mentioned later, it is assumed that the number of digitized bits of the DT code is two for simplicity of explanation. The decoder block of FIG. 15 has an arrangement corresponding to the encoder block shown in FIG. 5.

The dynamic range DR from an input terminal 61 is divided by 4 by a divider 63 (which is comprised of a bit shifter to shift data by two bits) and the resultant data is supplied to mulitpliers 64 and 65. The multiplier 64 triples the output of the divider 63, and multiplier 65 doubles the output of the divider 63. The outputs of the multipliers 64 and 65, the output of the divider 63, and the code in which eight bits are all "0" are supplied to a selector 66. The selector 66 selects either one of the four inputs in correspondence to the code DT from the input terminal 62 and outputs the selected input.

When the code DT is (0 0), the selector 66 selects the code of zero. When the coded code DT is (0 1), the selector 66 selects the output ($\frac{1}{4}$ DR) of the divider 63. When the DT is (1 0), the selector 66 selects the output (2/4 DR) of the multiplier 65. When the DT is (1 1), the selector 66 selects the output ($\frac{3}{4}$ DR) of the multiplier 64. The output of the selector 66 is supplied to an adder 68. The output of the divider 63 is divided by 2 by a divider 67, and the resultant data is supplied to the adder 68. Therefore, the data DTI after the removal of the minimum level is obtained at an output terminal 69 of the adder 68.

Figure 16:
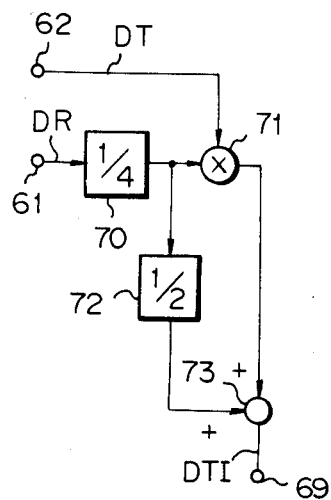
FIG. 16 is a block diagram of another example of a decoder block.

FIG. 16 shows another example of the decoder block 54. The example shown in FIG. 16 has an arrangement corresponding to the encoder block shown in FIG. 7.

In FIG. 16, a digital multiplier 71 multiplies a value of ($\frac{1}{4}$ DR) from a divider 70 and the code DT from the input terminal 62. The multiplied output of the multiplier 71 and a data of ($\frac{1}{8}$ DR) from a divider 72 are supplied to an adder 73. The data DTI after the removal of the minimum level is taken out at the output terminal 69 of the adder 73.

Figure 17:
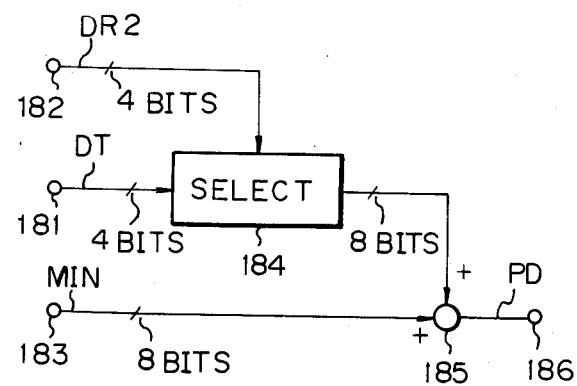
FIG. 17 is a block diagram of still another example of a decoder block.

FIG. 17 shows still another example of the decoder block 54 and has an arrangement corresponding to the encoder block shown in FIG. 9.

In FIG. 17, the input data DT is supplied to an input terminal 181 and the dynamic range information $DR_2$ inputted is supplied to an input terminal 182. The minimum level MIN is supplied to an input terminal 183. The data DT is supplied to a selecting circuit 184. The selecting circuit 184 generates an output of eight bits selected on the basis of the dynamic range information $DR_2$ from among five kinds of eightbit data in which four "0" bits were added to the high order side or low order side of the data DT of four bits.

The output data of the selecting circuit 184 corresponds to the data DTI after the removal of the minimum level. The output of the selecting circuit 184 is supplied to one input terminal of an adder 185. The minimum level MIN is supplied to the other input terminal of the adder 185. The picture element data PD is taken out at an output terminal 186 of the adder 185.

In the above description, three data of the code DT, dynamic range DR, and minimum level MIN are transmitted. However, as the additional codes, the minimum level MIN and maximum level MAX, or the dynamic range DR and maximum level MAX may be transmitted. Further, instead of transmitting the dynamic range DR, the minimum digitization level which is formed by this signal may be transmitted in place of this signal.

According to the present invention, the amount of data to be transmitted can be reduced compared with the amount of original data. Thus, the transmission band can be narrowed. In addition, this invention has an advantage such that in the non-moving portion of the picture where the dynamic range of picture element data is small, the original picture element data can be completely recovered from the received data with little or no deterioration of picture quality. Moreover, according to the invention, since the dynamic range is evaluated separately for each block, the reconstructed pictured responds very well to motion in the moving part of the picture such as the edge where the dynamic range is large.

The present invention is not limited to the foregoing embodiments but many modifications and variations are possible within the spirit and scope of the appended claims of the invention.

What is claimed is:

1. A highly efficient coding apparatus for coding digital video data in the form of blocks of digital video data representing plural picture elements so as to provide compressed video data, comprising:

first and second detecting means for detecting maximum and minimum values, respectively, of the digital video data representing the plural picture elements in each of said blocks, means for generating dynamic range information for each said block from said maximum and minimum values for the respective block, means for generating modified digital video data for each said block as the difference between each of the digital video data and one of said maximum and minimum values for said respective block, means for encoding said modified digital video data with a fixed digitized bit number less than the number of bits in said original digital video data so as to provide coded data of a reduced fixed bit length, and transmitting means for transmitting the coded data of reduced fixed bit length and an additional code for each said respective block formed of at least two of said maximum and minimum values and a signal corresponding to said dynamic range information.

2. A highly efficient coding apparatus according to claim 1, wherein said means for encoding includes a reference level signal generator supplied with said dynamic range information for generating a reference level signal, comparator means for comparing said modified digital video data and said reference level signal, and priority encoding means supplied with the output of said comparator means for generating said coded data of reduced fixed bit length therefrom.

3. A highly efficient encoding apparatus according to claim 1, wherein said means for encoding includes level dividing means supplied with said dynamic range information for level dividing said dynamic range information by a number corresponding to said fixed digitized bit number, and a digital divider for dividing said modified digital video data by the output of said level dividing means and providing said coded data of reduced fixed bit length as the result thereof.

4. A highly efficient encoding apparatus according to claim 1, wherein said means for encoding includes priority encoding means supplied with said dynamic range information and generating encoded dynamic range data with a smaller number of bits than that of said dynamic range information, and a bit selector supplied with said modified digital video data and controlled by said encoded dynamic range data for selecting the predetermined number of bits of said modified digital video data which is equal to said fixed digitized bit number.

5. A highly efficient coding apparatus according to claim 4, wherein said priority encoding means generates the encoded dynamic range data in accordance with the most significant bit position containing "1" in said dynamic range information.

6. A highly efficient coding apparatus according to claim 1, wherein said transmitting means adds parity data at least to said additional code.

7. A highly efficient coding apparatus according to claim 1, wherein said digital video data in each of said blocks represents a two-dimensional group of picture elements.

8. A highly efficient coding apparatus according to claim 1, wherein said digital video data in each of said blocks represents a one dimensional group of picture elements.

* * * * *